US010682031B2

(12) United States Patent
Lavoie

(10) Patent No.: US 10,682,031 B2
(45) Date of Patent: Jun. 16, 2020

(54) DUST COLLECTOR

(71) Applicant: Michel Lavoie, Quebec (CA)

(72) Inventor: Michel Lavoie, Quebec (CA)

( * ) Notice: Subject to any disclaimer, the term of this patent is extended or adjusted under 35 U.S.C. 154(b) by 20 days.

(21) Appl. No.: 15/788,035

(22) Filed: Oct. 19, 2017

(65) Prior Publication Data
US 2018/0192840 A1   Jul. 12, 2018

Related U.S. Application Data

(63) Continuation of application No. 14/865,311, filed on Sep. 25, 2015, now abandoned.

(30) Foreign Application Priority Data

Sep. 27, 2014  (GB) .................................. 1417125.0

(51) Int. Cl.
A47L 5/36 (2006.01)
A47L 9/16 (2006.01)
B01D 45/16 (2006.01)
B01D 46/24 (2006.01)
B01D 50/00 (2006.01)
A47L 9/12 (2006.01)

(52) U.S. Cl.
CPC ........... *A47L 9/1608* (2013.01); *A47L 9/1683* (2013.01); *B01D 45/16* (2013.01); *B01D 46/2403* (2013.01); *B01D 50/002* (2013.01); *A47L 9/127* (2013.01); *A47L 9/1666* (2013.01); *Y10S 55/03* (2013.01)

(58) Field of Classification Search
CPC .... A47L 9/1608; A47L 9/1683; A47L 9/1666; A47L 9/127; B01D 46/2403; B01D 50/002; B01D 45/16; Y10S 55/03
See application file for complete search history.

(56) References Cited

U.S. PATENT DOCUMENTS

| 4,133,658 A | 1/1979 | Callewyn |
| 4,715,872 A | 12/1987 | Snyder |
| 4,726,825 A | 2/1988 | Natale |
| 5,147,427 A | 9/1992 | Abbot et al. |
| 5,223,005 A | 6/1993 | Avondoglio |
| 5,259,854 A | 11/1993 | Newman |
| 5,287,591 A * | 2/1994 | Rench ........................ A47L 5/30 15/328 |
| 5,863,309 A | 1/1999 | Louis et al. |
| 6,171,356 B1 | 1/2001 | Twerdun |

(Continued)

FOREIGN PATENT DOCUMENTS

CN  202667015 U  1/2013
GB     442108 A  2/1936

(Continued)

*Primary Examiner* — Dung H Bui

(57) ABSTRACT

A dust collector for filtering dust suspended in air, comprising: a vacuum unit for drawing the air; a cyclone body defining a cyclone body peripheral wall delimiting a plenum, a cyclone air inlet provided in the cyclone body peripheral wall for admitting the air, a cyclone body vacuum inlet in fluid communication with the vacuum unit for drawing the air from the plenum and a cyclone body dust outlet provided at the bottom of the plenum for evacuating the dust from the cyclone body; and baffles extending in the plenum from the cyclone body peripheral wall.

16 Claims, 5 Drawing Sheets

(56) References Cited

U.S. PATENT DOCUMENTS

| | | |
|---|---|---|
| 6,228,151 B1 | 5/2001 | Conrad et al. |
| 6,616,721 B2 | 9/2003 | Oh |
| 6,782,585 B1 * | 8/2004 | Conrad .................. A47L 5/225 |
| | | 15/351 |
| 6,810,557 B2 | 11/2004 | Hansen et al. |
| 6,834,412 B2 | 12/2004 | Stanovich et al. |
| 6,991,667 B2 | 1/2006 | Yang et al. |
| 7,105,034 B2 | 9/2006 | Jung et al. |
| 7,203,994 B2 | 4/2007 | Smith |
| 7,247,180 B1 | 7/2007 | Hill |
| 7,326,267 B2 | 2/2008 | David |
| 7,449,040 B2 | 11/2008 | Conrad et al. |
| 7,645,311 B2 | 1/2010 | Oh et al. |
| 7,708,789 B2 | 5/2010 | Fester |
| 7,731,770 B2 | 6/2010 | Strutt et al. |
| 7,748,079 B2 | 7/2010 | McDowell et al. |
| 7,887,611 B2 | 2/2011 | Asal et al. |
| 7,988,756 B2 | 8/2011 | Fujiyama et al. |
| 8,083,824 B2 | 12/2011 | Fujiyama et al. |
| 8,161,597 B2 | 4/2012 | Witter et al. |
| 8,393,050 B2 | 3/2013 | Witter |
| 8,496,719 B2 | 7/2013 | Witter |
| 8,679,211 B1 * | 3/2014 | Makarov ............... A47L 9/1641 |
| | | 55/343 |
| 8,978,199 B2 | 3/2015 | Kasper et al. |
| 2006/0230724 A1 * | 10/2006 | Han ....................... A47L 9/1625 |
| | | 55/345 |
| 2007/0175185 A1 | 8/2007 | Kim et al. |
| 2008/0086836 A1 | 4/2008 | Carr et al. |
| 2012/0000029 A1 * | 1/2012 | Nicolaou ............... A47L 9/1625 |
| | | 15/300.1 |
| 2012/0167336 A1 * | 7/2012 | Tran ...................... A47L 9/1633 |
| | | 15/347 |
| 2013/0091658 A1 * | 4/2013 | Smith .................... A47L 9/009 |
| | | 15/347 |
| 2014/0082883 A1 * | 3/2014 | Tran ...................... A47L 9/1633 |
| | | 15/353 |
| 2014/0223690 A1 | 8/2014 | Witter et al. |
| 2016/0206169 A1 * | 7/2016 | Hyun .................... A47L 9/1633 |

FOREIGN PATENT DOCUMENTS

| | | |
|---|---|---|
| GB | 800195 A | 8/1958 |
| JP | 2002326041 A | 11/2002 |
| WO | 1995034238 A1 | 12/1995 |

* cited by examiner

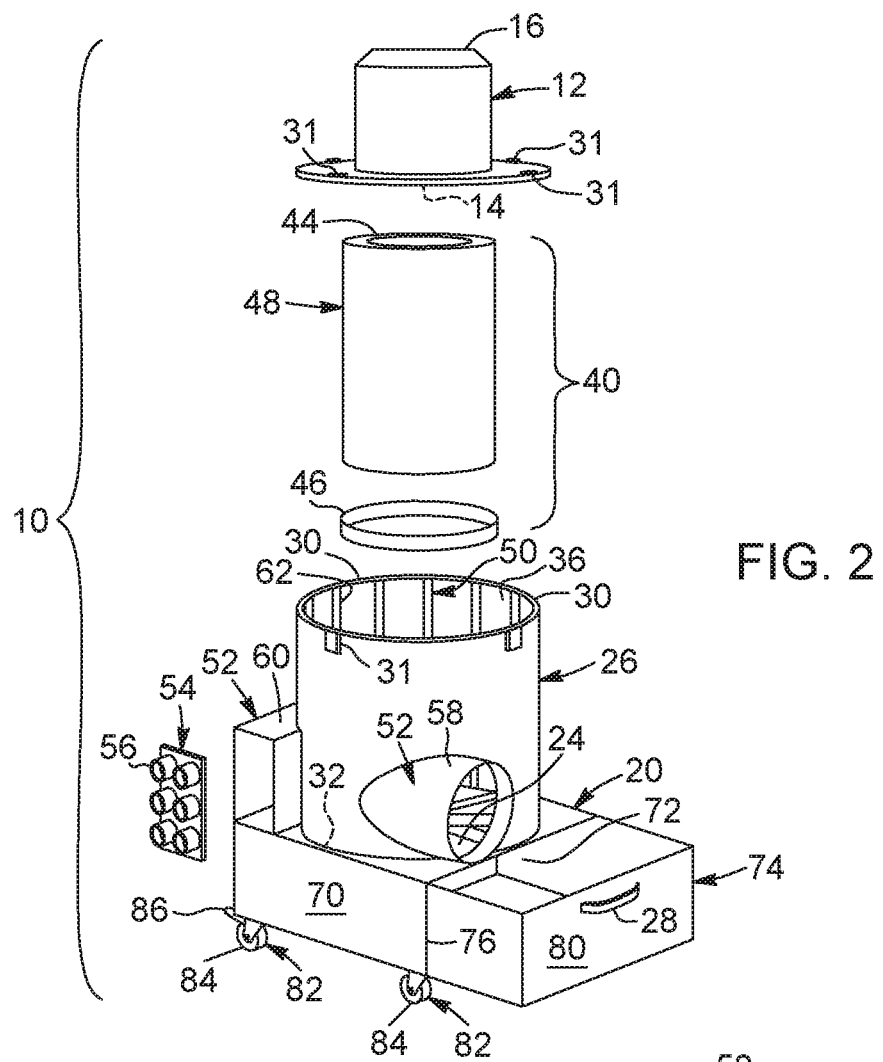
FIG. 2
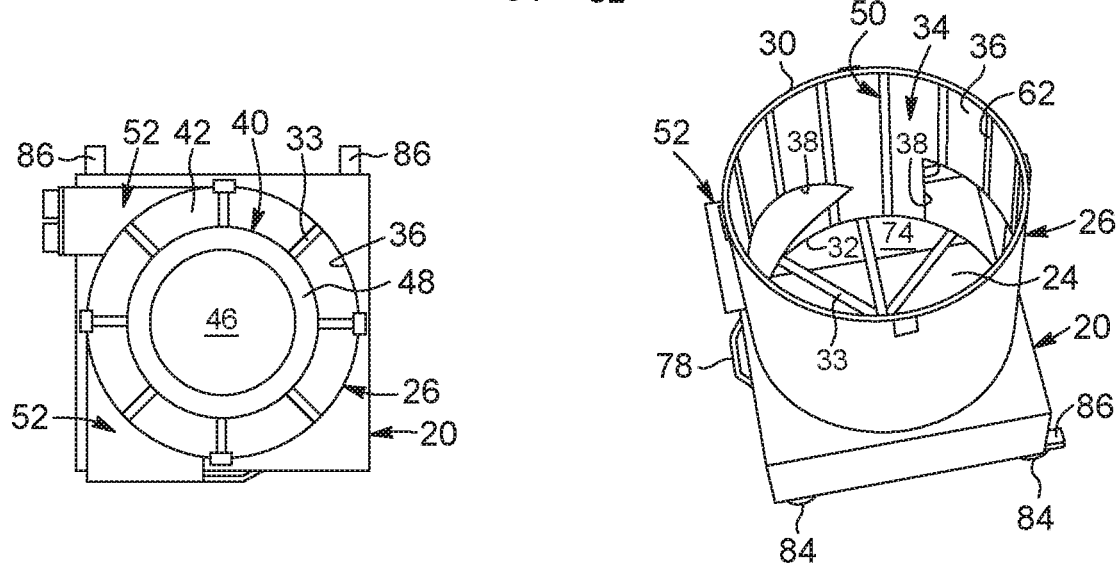
FIG. 3
FIG. 4

DUST COLLECTOR

FIELD OF THE INVENTION

The present invention relates generally to air filtering devices and, more particularly, to a dust collector.

BACKGROUND

Industrial grade dust collectors are well known for collecting dust on floors, near power tools, as well as airborne particles such as sawdust, gypsum dust and the likes in construction sites or woodshops where air quality and fire safety for workers are primary concerns.

Known industrial grade dust collectors that are portable to construction sites typically comprise a vacuum blower unit fluidly coupled to a vacuum chamber, containing a vacuum filter, and a dust collecting means for collecting dust particles filtered from a dust laden air by the dust filter.

While these known dust collector devices can generally fulfill the main objective of collecting airborne dust in and around a construction site or the likes, they are also generally reputed to be significantly cumbersome to move around, particularly through door frames, complex to maintain, such as when a cleaning or replacement operation of the vacuum filter is required, and significantly expensive to buy by small work contractors.

Thus, small contractors are often tempted to omit the acquisition of such dust collectors and, consequently, put the basic health and safety work measures at risk of not being met for their workers.

In view of the above, there is a need in the industry for an improved dust collector.

An object of the present invention is to provide such a dust collector.

SUMMARY OF THE INVENTION

In a broad aspect, the present invention provides an improved dust collector usable for filtering and collecting dust particles from dust laden air.

According to an embodiment of the present invention, the dust collector comprises a vacuum blower unit. The vacuum blower unit defines a blower unit inlet and a blower unit outlet.

The dust collector further comprises a dust drawer unit for collecting dust particles. The dust drawer unit defines a dust drawer unit inlet for receiving filtered dust particles therethrough.

The dust collector further comprises a cyclone chamber unit that extends between the blower unit inlet and the drawer unit dust inlet.

The cyclone chamber unit defines a cyclone chamber first opening fluidly coupled with the vacuum unit inlet, a cyclone chamber second opening fluidly coupled with the dust drawer inlet, and a cyclone chamber plenum extending between the cyclone chamber first opening and the cyclone chamber second opening respectively.

The cyclone chamber plenum is defined by a cyclone chamber inner wall. The cyclone chamber inner wall has a substantially cylindrical configuration and extends axially vertically between the blower unit inlet at an upper end thereof, and the drawer unit dust inlet at a bottom end thereof.

The cyclone chamber inner wall defines at least one cyclone chamber port opening that is extending through a peripheral portion of the wall. The at least one cyclone chamber port opening is fluidly coupled to a source of dust laden air.

The dust collector further comprises a vacuum filter unit having typically a substantially cylindrical configuration and positioned axially centrally within the cyclone chamber plenum.

The vacuum filter unit is sized and shaped so as to define a wall-to-filter space extending coaxially between the cyclone chamber inner wall and the vacuum filter unit.

The vacuum filter unit is closed at one end and defines a filter opening at an opposed end thereof. The filter opening is fluidly coupled to the blower unit inlet.

The dust collector further comprises at least one dust baffle. Each one of the at least one dust baffle is attached to the cyclone chamber unit and positioned in the wall-to-filter space for impacting with dust particles circulating therein.

Thus, when the vacuum blower unit is powered on, a forced stream of dust laden air is circulated through the at least one cyclone chamber port opening, then into the wall-to-filter space, then through the vacuum filter unit, then into the blower unit inlet, and finally exhaust out of the blower unit outlet.

Thereby, with dust particles circulating through the wall-to-filter space, a significant portion thereof impacts with the at least one dust baffle so as to lose sufficient velocity for falling by gravity through the dust drawer unit inlet and be collected in the dust drawer unit, while substantially all the rest of the dust particles impacts with the vacuum filter unit before eventually falling also into the dust drawer unit.

This impacting effect of the at least one baffle on the circulating dust particles in the cyclone chamber unit is advantageous since it significantly reduces the clogging effect of the vacuum filter unit by the dust particles while the dust collector is in operation.

In some embodiments, the cyclone chamber unit includes a plurality of dust baffle attached in a circumferentially spaced apart relationship along the cyclone chamber inner wall. The plurality of dust baffle extends between the cyclone chamber first opening and the cyclone chamber second opening.

In some embodiments, each one in the plurality of dust baffle may be represented by a substantially rectilinear and vertically extending stem member.

In some other embodiments, each one in the plurality of dust baffle may be represented by a pair of stem members arranged in a horizontally extending V-shaped configuration, wherein the apex thereof is directed against the direction of the vortex, and positioned substantially in register with an horizontal plane extending substantially centrally through the at least one cyclone chamber port opening.

In some other embodiments, a significant portion of each spaced apart distal ends of the V-shaped configuration may be extending oppositely distally relatively to one another, and vertically towards an adjacent one of the cyclone chamber first opening and the cyclone chamber second opening respectively.

In yet some other embodiments, the at least one dust baffle may be represented by a single tube-shaped grid composed of superposed stem members that define diamond shaped intersections. The tube-shaped grid preferably adjacently conforms to, and is attached along, the cyclone chamber inner wall, and extends axially longitudinally between the cyclone chamber first opening and the cyclone chamber second opening.

In some embodiments, each stem member may define a substantially rectangular cross-section.

In some other embodiments, each stem member may define a cross-section having a substantially right-angle triangle configuration, wherein one of the edges in the right angle is substantially perpendicularly facing against the direction of the vortex.

In yet some other embodiments, each stem member may define a cross-section having a substantially right-angle triangle configuration, wherein one of the edges in the right angle is substantially perpendicularly facing away from the direction of the vortex.

The stem members are for example made of one of the materials selected from the group consisting of metal, rubber and ceramic.

The dust drawer unit includes a dust drawer housing defining a drawer bay for removably receiving therein in a slide-fit relation a dust drawer through a drawer bay opening defined through a lateral wall thereof.

The drawer unit dust inlet is in fluid communication with the interior of the drawer bay and in register substantially above a top opening of the dust drawer when the latter is fully slidably engaged in the drawer bay using a drawer handle provided at a front end thereof.

The dust collector further includes wheels, such as caster wheels, for allowing the dust collector to be portably wheeled to a desired location.

The dust collector has for example an overall dimension in height and at least one overall dimension in width that are suitably dimensioned for allowing the dust collector to freely pass, in an upright attitude, through a conventionally sized door frame.

A method of use of the dust collector is substantially identical to the method of use of conventional vacuum units commonly found in industrial environments, construction sites, woodshops and the likes.

Thus, the present invention provides a dust collector for filtering dust laden air that is significantly more easily moved around through door frames of construction sites, is relatively more easy maintained due to its relatively simple assembly, as well as being relatively inexpensive to manufacture, when compared to known industrial dust collectors actually used on construction sites and the likes.

The present application claims benefit from UK request application 1417125.0 filed Sep. 27, 2014, the contents of which is hereby incorporated by reference in its entirety.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 2, in a perspective, exploded view, illustrates the dust collector in FIG. 1;

FIG. 3, in a top plan view, illustrates the dust collector in FIG. 1, here shown with its vacuum blower unit removed;

FIG. 4, in a top perspective view, illustrates the dust collector in partial view in FIG. 3, here shown with the vacuum blower unit and vacuum filter unit removed;

DETAILED DESCRIPTION

Figure 1:
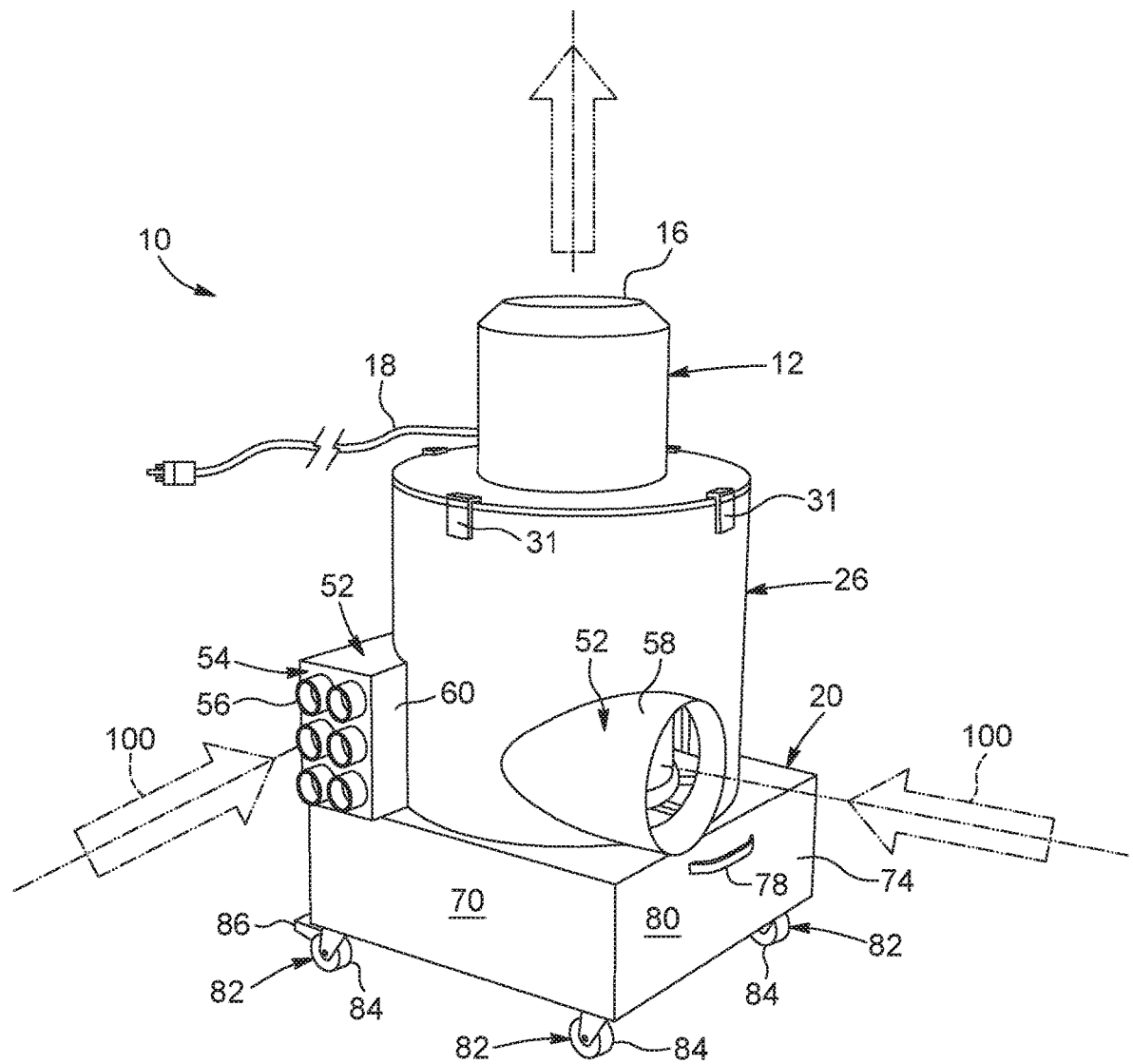
FIG. 1, in a perspective view, illustrates an embodiment of a dust collector, according to the present invention.
Figure 5:
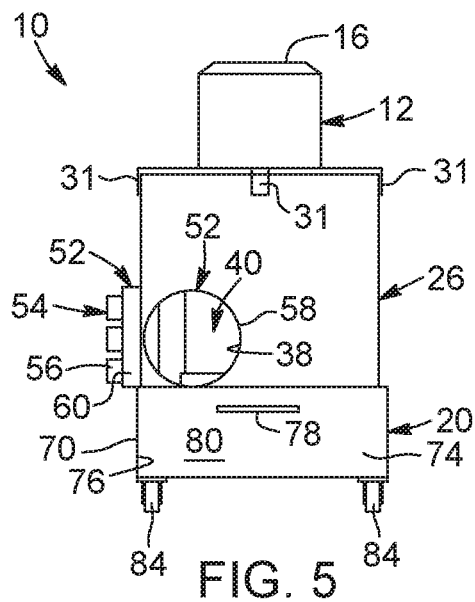
FIG. 5, in a front elevational view, illustrates the dust collector in FIG. 1.
Figure 6:
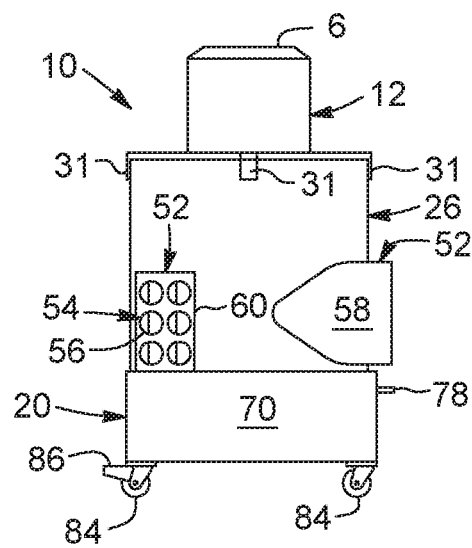
FIG. 6, in a left side elevational view, illustrates the dust collector in FIG. 1.
Figure 7:
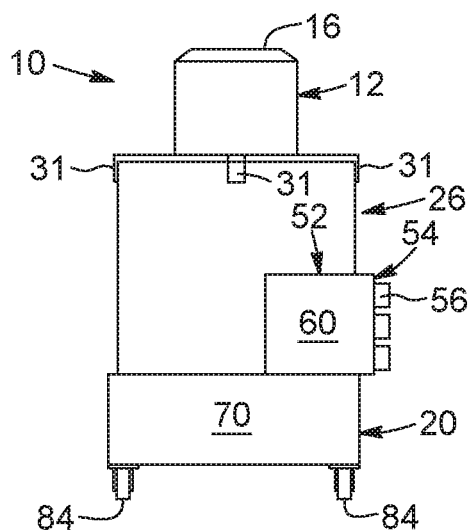
FIG. 7, in a rear elevational view, illustrates the dust collector in FIG. 1.
Figure 8:
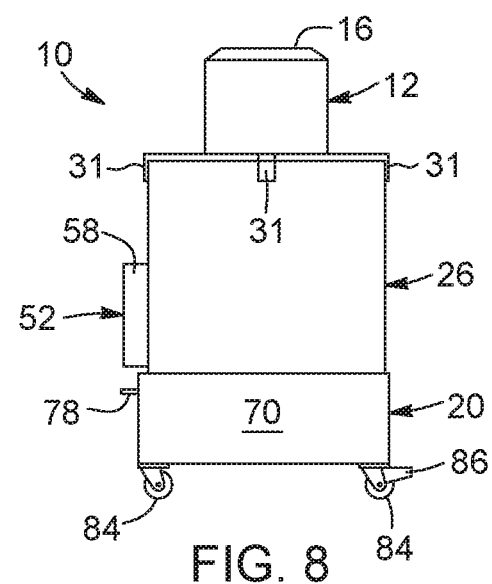
FIG. 8, in a right side elevational view, illustrates the dust collector in FIG. 1.
Figure 9:
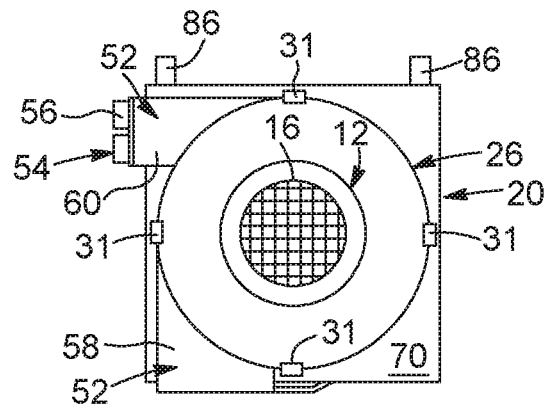
FIG. 9, in a top plan view, illustrates the dust collector in FIG. 1.

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art. Also, directional terminology, such as bottom, refers to the holder of the invention in a typical free-standing, upstanding, configuration, resting on a table surface for example, before it is handled to pour a beverage. This reference configuration is for reference and convenience purposes and should not be used to restrict the scope of the claims unless explicitly required by the structure of a specific claim. The reader skilled in the art will understand that the holder may be, in some embodiments, perfectly usable standing on its side when compared to the description below. However, typical use of the holder when no beverage is poured is usually with the holder upstanding as seen the drawings and described below.

FIGS. 1, 2 and 5 to 9 inclusively, illustrates various aspects of an embodiment, according to the present invention, of a dust collector 10 usable for filtering and collecting dust particles from dust laden air.

The dust collector 10 comprises a vacuum blower unit 12. The vacuum blower unit 12 defines a blower unit inlet 14 and a blower unit outlet 16. The vacuum blower unit 12 is powered by an external electrical source such as, for example, through a conventional 110 VAC power cord 18 plugged into a wall outlet or the likes.

The dust collector 10 further comprises a dust drawer unit 20 for collecting dust particles filtered from a dust laden air 100, by the dust collector 10.

The dust drawer unit 20 is disposed in a spaced apart relationship relative to the vacuum blower unit 12. Furthermore, the dust drawer unit 20 defines a dust drawer unit inlet 24 for receiving filtered dust particles therethrough.

The dust collector 10 further comprises a cyclone chamber unit 26. The cyclone chamber unit 26 extends between the blower unit inlet 14 and the drawer unit dust inlet 24. In some embodiments, the internal portion of the cyclone chamber unit, including or no the dust baffles 50 described hereinbelow, may be covered with or coated with a substantially resilient material, such as rubber or a similar material, to absorb energy from dust particles circulating in the cyclone chamber unit 26.

The cyclone chamber unit 26 defines a cyclone chamber first opening 30 fluidly coupled with the vacuum unit inlet 14, a cyclone chamber second opening 32 fluidly coupled with the dust drawer inlet 24, and a cyclone chamber plenum 34 extending between the cyclone chamber first opening 30 and the cyclone chamber second opening 32 respectively.

The cyclone chamber plenum 34 is defined by a cyclone chamber inner wall 36. The cyclone chamber inner wall 36 has a substantially cylindrical configuration and extends axially vertically between the blower unit inlet 14 at an upper end thereof, and the drawer unit dust inlet 24 at a bottom end thereof.

The cyclone chamber inner wall 36 defines at least one cyclone chamber port opening 38, as best illustrated in FIG. 4, that is extending through a peripheral portion of the wall 36, thus creating a fluid passageway between the exterior of the dust collector 10 and the cyclone chamber plenum 34. The at least one cyclone chamber port opening 38 being fluidly coupled to a source of dust laden air 100.

The dust collector 10 further comprises a vacuum filter unit 40. The vacuum filter unit 40 has a substantially cylindrical configuration and is positioned axially centrally within the cyclone chamber plenum 34.

The vacuum filter unit 40 is sized and shaped so as to define a wall-to-filter space 42 extending coaxially between the cyclone chamber inner wall 36 and the vacuum filter unit 40.

The vacuum filter unit 40 is closed at one end and defines a filter opening 44 at an opposed end thereof. The filter opening 44 is fluidly coupled to the blower unit inlet 14.

As exemplified in FIG. 2, the vacuum filter unit 40 has a tubular configuration with a lower end thereof sealably closed with an end cap 46, and its upper end sealably coupled with the blower unit inlet 14 of the vacuum blower unit 12.

In some embodiments, the vacuum filter unit 40 includes a HEPA grade filter 48, for example a H14 class filter which must filter 99.995% of particles (e.g. particles smaller than 0.1 microns). Thus, with a tube shaped HEPA filter 48 having thus only one opening securely sealed around the blower unit inlet 14, the dust collector 10 conforms to some of the standardized HEPA specifications for air filtering vacuum units. The filter 48 may also be covered by a metallic or polymeric (such as Nylon™) mesh, or both, to protect against fire propagation.

Conveniently, for facilitating the periodic cleaning or replacement of the vacuum filter unit 40, the latter may be suitably sized in length so as to be positioned in a vertically compressed state between a support grid 33 at the junction between the cyclone chamber unit 26 and the blower unit inlet 14. The vacuum blower unit 12 is removably sealably attached to a peripheral edge of the cyclone chamber first opening 30 of the cyclone chamber unit 26 through a plurality of selectively detachable clips assemblies 31 positioned in radially spaced apart relationship therearound.

The dust collector 10 further comprises at least one dust baffle 50, and typically a plurality of dust baffles 50. Each one of the at least one dust baffle 50 is attached to the cyclone chamber unit 26 and positioned in the wall-to-filter space 42 for impacting with dust particles circulating therein. In some embodiments, the dust baffles 50 are substantially elongated and substantially parallel to the longitudinal axis of the cyclone chamber unit. In other embodiments, the dust baffles are angled with respect to an axis parallel to the longitudinal axis of the cyclone chamber unit, for example between 20 and 90 degrees relative to the horizontal, and in a very specific example at substantially 30 degrees relative to the horizontal. The dust baffles 50 may be angled so that they go upwardly, downwardly, or alternatively upwardly and downwardly when going along the vortex, which deflects the dust particles upwardly and/or downwardly.

Thus, when the vacuum blower unit 12 is powered on, a forced stream of dust laden air 100 is circulated through the at least one cyclone chamber port opening 38, then into the wall-to-filter space 42, then through the vacuum filter unit 40, then into the blower unit inlet 14, and finally exhaust out of the blower unit outlet 16. Thereby, with dust particles circulating through the wall-to-filter space 42, a significant portion thereof impacts with the at least one dust baffle 50 so as to lose sufficient velocity for falling by gravity through the dust drawer unit inlet 24 and be collected in the dust drawer unit 20, while substantially all the rest of the dust particles impacts with the vacuum filter unit 40 before eventually falling also into the dust drawer unit 20.

This impacting effect of the at least one baffle 50 on the circulating dust particles in the cyclone chamber unit 26 is advantageous in the present invention since it significantly reduces the clogging effect of the vacuum filter unit 40 by the dust particles while the dust collector 10 is in operation.

Now referring more particularly to FIGS. 1 to 4 inclusively, the dust collector 10 may further include at least one port duct 52. The at least one port duct 52 defines a tubular configuration having one end fluidly coupled to a corresponding one of the at least one cyclone chamber port opening 38, and extends distally therefrom tangentially relative to the cyclone chamber inner wall 36 so as to force the circulating dust laden air 100 into a vortex 102 rotating coaxially within the wall-to-filter space 42.

In some embodiments, each one of the at least one port duct 52 may have a vertical cross-section dimension that is roughly equivalent to between $1/4$ and $1/2$ of the longitudinal axis of the cyclone chamber inner wall 36. In some specific embodiments of the present invention, the cross-section diameter of the at least one port duct 52 is roughly equivalent to ⅓ of the length of thereof the cyclone chamber inner wall 36 along its longitudinal axis.

In some embodiments, at least one of the at least one port duct 52 further includes a port duct manifold 54. The port duct manifold 54 defines at least two individual vacuum ports 56 for selectively coupling thereto, for example, a respective number of vacuum tubing's equipped with vacuum heads or the like (not shown).

For example, the port duct manifold 54 may define six individual vacuum ports 56. As would be obvious with someone familiar with industrial vacuum units, the individual vacuum ports 56 may be typically equipped with quick-connect couplings that are automatically sealed close when not in use (not shown).

In some embodiments the dust collector 10 includes two port ducts 52, with a first port duct 58 having a circular cross-section, and a second port duct 60 having a vertically extending rectangular cross-section. Each cyclone chamber port opening 38 corresponding to a respective one of the first and second port ducts 58 and 60 is shaped and sized to conform to the junction between the cyclone chamber inner wall 36 and each port duct respectively, as illustrated in FIG. 4.

The first port duct 58 and the second port duct 60 each extends tangentially relative to the cyclone chamber inner wall 36 and perpendicularly relative to one another along a common horizontal plane, and with both port ducts disposed adjacently relative to the cyclone chamber second opening 32.

Now referring more particularly to FIGS. 4 and 10 to 18 inclusively, in some embodiments, the cyclone chamber unit 26 includes a plurality of dust baffles 50 attached in a circumferentially spaced apart relationship along the cyclone chamber inner wall 36. The plurality of dust baffles 50 extends between the cyclone chamber first opening 30 and the cyclone chamber second opening 32.

Figures 10, 11, 12, 13:
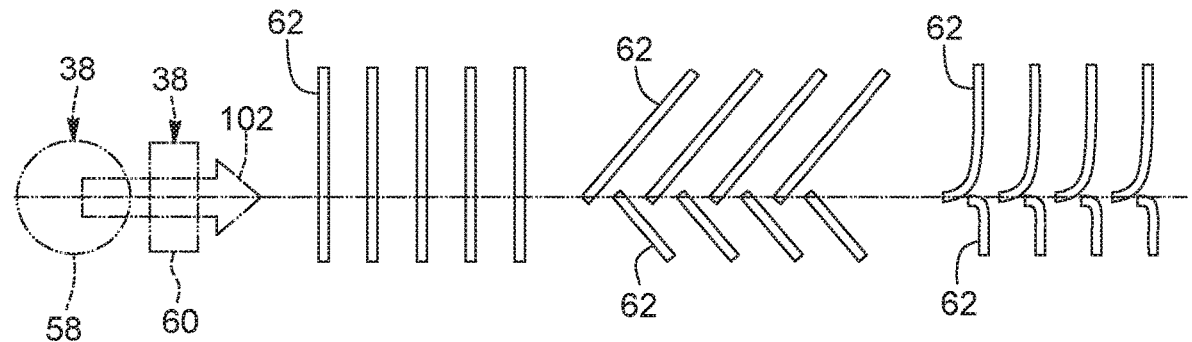
FIG. 10, in a schematic side plan view, illustrates the relative horizontal alignment and shape configuration of a pair of cyclone chamber port openings usable in the dust collector of FIG. 1.
FIG. 11, in a schematic side plan view, illustrates baffles of a first type usable in the dust collector of FIG. 1.
FIG. 12, in a schematic side plan view, illustrates baffles of a second type usable in the dust collector of FIG. 1.
FIG. 13, in a schematic side plan view, illustrates baffles of a third type usable in the dust collector of FIG. 1.

In some embodiments, as illustrated in FIG. 11, each one in the plurality of dust baffles 50 may be represented by a substantially rectilinear and vertically extending stem member 62.

In some other embodiments, as illustrated in FIG. 12, each one in the plurality of dust baffles 50 may be represented by a pair of stem members 62 arranged in a horizontally extending V-shaped configuration, wherein the apex thereof is directed against the direction of the vortex 102, and positioned substantially in register with an horizontal plane extending substantially centrally through the at least one cyclone chamber port opening 38 (as illustrated in FIG. 10).

In some other embodiments, as illustrated in FIG. 13, a significant portion of each spaced apart distal ends of the V-shaped configuration may be extending oppositely distally relatively to one another, and vertically towards an adjacent one of the cyclone chamber first opening 30 and the cyclone chamber second opening 32 respectively.

Figures 17, 18:
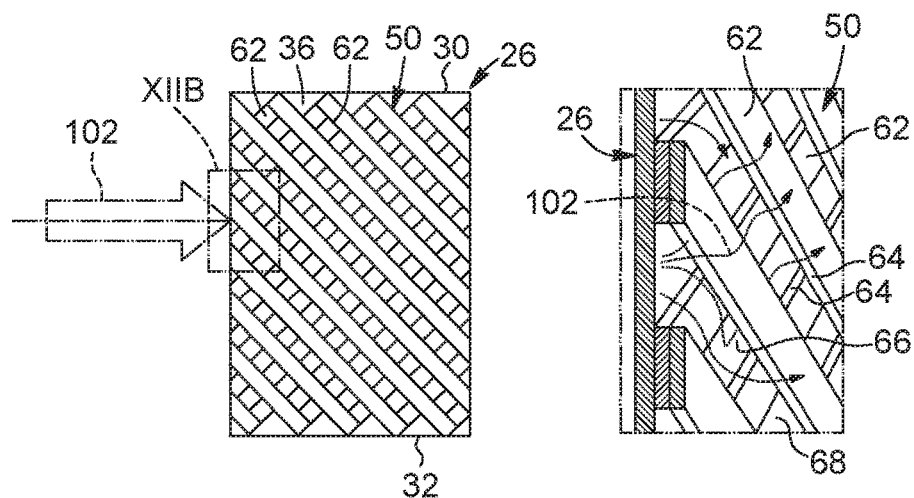
FIG. 17, in an elevational, side plan view, illustrates another shape configuration of a baffle.
FIG. 18, in an enlarged, side perspective view, illustrates the shape configuration of a baffle within section line XIIA of FIG. 17.

In yet some other embodiments, as illustrated in FIGS. 17 and 18, the at least one dust baffle 50 may be represented by a single tube-shaped grid (only partially showed in the figures) composed of superposed stem members 62 that define diamond shaped intersections. The tube-shaped grid preferably adjacently conforms to, and is attached along, the cyclone chamber inner wall 36, and extends axially longitudinally between the cyclone chamber first opening 30 and the cyclone chamber second opening 32.

Each stem member 62 in an intersection between two stem members 62 is substantially at forty five degree relative to the vertical, and substantially at a ninety degree angle relative to one another. Thus, a plurality of angled surfaces 64 are created in opposition to the direction of the vortex 102, and a plurality of relatively short passageways 66 and pocket interstices 68 are created at intersections between superposed stem members 62. In turn, the angled surfaces 64, passageways 66 and pocket interstices 68 cooperatively create impacting obstacles on the trajectories of dust particles circulated by the vortex 102 therein.

Figures 14, 15, 16:
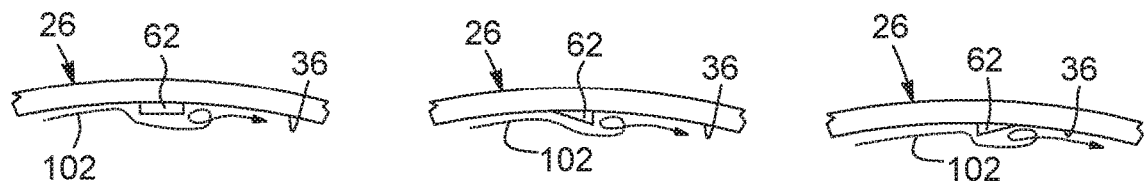
FIG. 14, in an end plan view, illustrates a first transversal cross-sectional configuration of a baffle usable in the dust collector of FIG. 1.
FIG. 15, in an end plan view, illustrates a second transversal cross-sectional configuration of a baffle usable in the dust collector of FIG. 1.
FIG. 16, in an end plan view, illustrates a third transversal cross-sectional configuration of a baffle usable in the dust collector of FIG. 1.

In some embodiments, as illustrated in FIG. 14, each stem member 62 may define a substantially rectangular cross-section.

In some other embodiments, as illustrated in FIG. 15, each stem member 62 may defines a cross-section having a substantially right-angle triangle configuration, wherein one of the edges in the right angle is substantially perpendicularly facing against the direction of the vortex.

In yet some other embodiments, as illustrated in FIG. 16, each stem member 62 may define a cross-section having a substantially right-angle triangle configuration, wherein one of the edges in the right angle is substantially perpendicularly facing away from the direction of the vortex.

Figure 19:
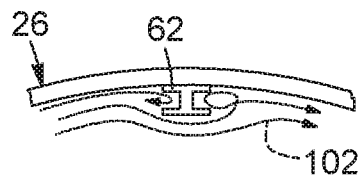
FIG. 19, in an end plan view, illustrates a fourth transversal cross-sectional configuration of a baffle usable in the dust collector of FIG. 1.

In yet some other embodiments, as illustrated in FIG. 19, each stem member 62 may define a transversal cross-section having a substantially H-shaped configuration, wherein the two openings of the H face respectively towards and away from the direction of the vortex 102.

Figure 20:
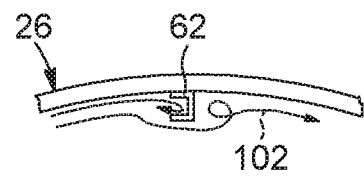
FIG. 20, in an end plan view, illustrates a fifth transversal cross-sectional configuration of a baffle usable in the dust collector of FIG. 1.

In yet some other embodiments, as illustrated in FIG. 20, each stem member 62 may define a transversal cross-section having a substantially C-shaped configuration, wherein the opening of the C faces towards the direction of the vortex 102.

Figure 21:
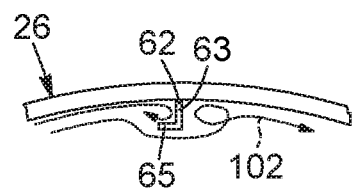
FIG. 21, in an end plan view, illustrates a sixth transversal cross-sectional configuration of a baffle usable in the dust collector of FIG. 1.

In yet some other embodiments, as illustrated in FIG. 21, each stem member 62 may define a transversal cross-section having a substantially L-shaped configuration, oriented to that one leg 63 of the "L" is substantially perpendicular to the peripheral wall of the cyclone chamber unit 26 and the other leg 65 is substantially perpendicular to the first leg 63, and points towards the direction from which the vortex 102 comes.

Figure 22:
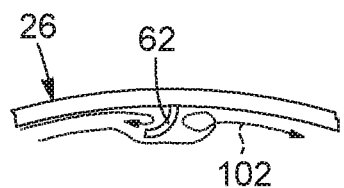
FIG. 22, in an end plan view, illustrates a seventh transversal cross-sectional configuration of a baffle usable in the dust collector of FIG. 1.

In yet some other embodiments, as illustrated in FIG. 22, each stem member 62 may define a transversal cross-section having a substantially arc-segment shape oriented similarly to the L-shaped configuration of the stem member 62 of FIG. 21.

Figure 23:
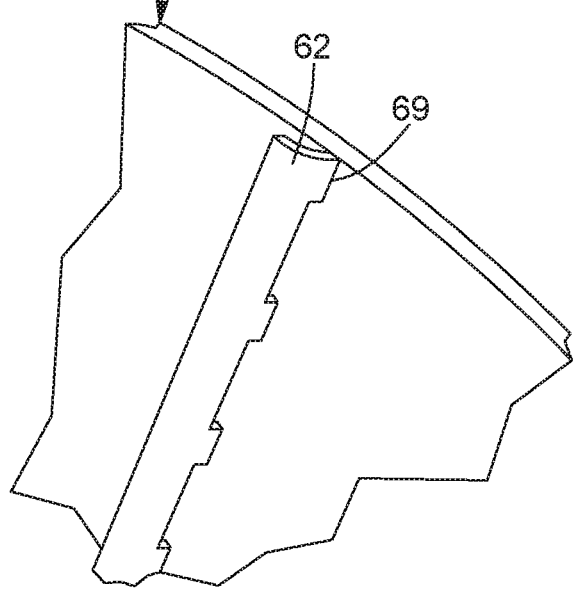
FIG. 23, in a perspective view, illustrates baffles of a fourth type usable in the dust collector of FIG. 1.
Figure 24:
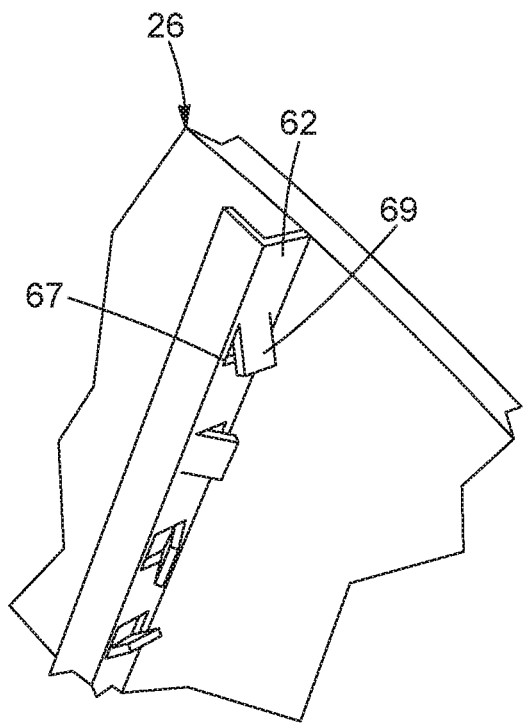
FIG. 24, in a perspective view, illustrates baffles of a fifth type usable in the dust collector of FIG. 1.

In some embodiments, the stem members 62 of FIGS. 11 to 16 and 19 to 22 may be of constant cross-section longitudinally therealong, with no apertures therein. In other embodiments, apertures 67 are provided in the stem members 62 and extend therethrough, as seen in FIGS. 23 and 24. The apertures 67 may be deprived of material in register with them, as seen in FIG. 23. The apertures 67 may also have a louver 69 in register with them, as seen in FIG. 25. The apertures 67 may be substantially adjacent to the peripheral wall of the cyclone chamber unit 26, as seen in FIG. 23, or spaced apart therefrom, as seen in FIG. 24. The apertures 67 reduce the loss of velocity in the vortex 102 due to the stem members 62. For examples, the louvers 69 and apertures 67 are manufactured simultaneously by punching the apertures 67 with a side thereof remaining intact and bending the resulting louver 69 away, at an angle, from the aperture 67.

The reader skilled in the art will appreciate that the dust baffles 50 may all have the same configuration, or that the various configurations described hereinabove and illustrated in FIGS. 11 to 24 may be mixed together in the same unit.

Stem members 62 that are adjacently parallelly extending are spaced apart a distance of roughly between one and fifty

(50) centimeters. Preferably, the distance between adjacently parallelly extending stem members is roughly twenty (20) centimetres.

Each stem member 62 may have a stem radial cross-section dimension extending radially inwardly relative to the cyclone chamber inner wall 36 that is roughly between 0.5 and 10 centimeters. Preferably, the stem radial cross-section dimension is about 1 centimetre.

The stem members 62 are for example made of one or more of the materials selected from the group consisting of metal, rubber and ceramic.

Without limiting the claims, except when such claims explicitly mention mechanisms of action, the dust baffles 50 are believed to operate as follows. The portion of each stem member 62 that faces the vortex 102 typically contribute to the deflection of dust particles to reduce their speed, mainly for the larger dust particles. The portion of each stem member 62 that faces away from the vortex 102 creates turbulence, which reduces the velocity along the vortex 102 of the other particles. Since the dust particles lose velocity more quickly than in dust collectors in which there are no baffles 50, the vacuum filter unit 40 requires less maintenance.

The vacuum blower unit 12 preferably includes a vacuum blower housing defining a blower fluid passageway between the blower unit inlet 14 and the blower unit outlet 16. A blower assembly represented by a blower turbine coupled to the rotor of an electrical blower motor is mounted axially centrally within the blower fluid passageway so as to have blown air circulating around the blower assembly and, thus, effectively cool the blower motor during operation.

Furthermore, the blower assembly is designed to generate a cubic per minute (CFM) of airflow that does not exceeds the capacity of the vacuum filter unit 40. Thus, the dust collector 10 may conform to some of the standardized HEPA specifications for air filtering vacuum units.

The dust drawer unit 20 includes a dust drawer housing 70 defining a drawer bay 72 for removably receiving therein in a slide-fit relation a dust drawer 74 through a drawer bay opening 76 defined through a lateral wall thereof.

The drawer unit dust inlet 24 is in fluid communication with the interior of the drawer bay 72 and in register substantially above a top opening of the dust drawer 74 when the latter is fully slidably engaged in the drawer bay 72 using a drawer handle 78 provided at a front end thereof.

The drawer bay opening 76 and the dust drawer 74 cooperatively form a hermetically sealed junction therebetween when the dust drawer 74 is fully slidably engaged in the drawer bay 72 so as to prevent any vacuum leakage. For example, a sealing ring (not shown) may be provided along the circumference of the drawer bay opening 76 for sealably contacting a peripheral portion of the front end wall 80 of the dust drawer 74.

Other configurations of a dust drawer unit 20 and sealing means are also possible. For example (not shown), the dust drawer housing 70 may be represented by a downward extension of the cylindrically shaped cyclone chamber inner wall 36 with a suitably shaped dust bay opening and a cylindrically shaped dust drawer.

The dust collector 10 further includes wheels 82 for allowing the dust collector 10 to be portably wheeled to a desired location.

The wheels 82 may be preferably represented by four swivelling caster wheels 84 with at least two having park break levers 86. The caster wheels are attached in a spaced apart relationship along underside surface portions of the dust drawer unit 20.

In other embodiments, the wheels may be represented by a conventional hand dolly (not shown) that is attached to a side portion of the dust collector 10.

Thus, the dust collector 10 may be easily moved around and stably stationed on floors and through door frames of, for examples, residential houses, apartment blocks and work office buildings in construction.

The dust collector 10 may be made of materials such as steel, aluminum, and plastic materials that are conventionally used in the manufacture of similar vacuum devices.

Furthermore, the dust collector 10 has an overall dimension in height and at least one overall dimension in width that are suitably dimensioned for allowing the dust collector 10 to freely pass, in an upright attitude, through a conventionally sized door frame.

As would be obvious to someone familiar with the art of industrial vacuum devices, the dust collector 10 of the present invention can be shaped and sized to suit the required capacity of a given vacuuming application. Furthermore, alternatively to the wheels 82, the dust collector 10 may be attached to a stationary support structure such as a wall or floor for a more permanent installation.

A preferred method of use of the dust collector 10 is substantially identical to the method of use of conventional vacuum units commonly found in industrial environments, construction sites, woodshops and the likes.

Thus, the present invention provides a dust collector 10 for filtering dust laden air that is significantly more easily moved around through door frames of construction sites, is relatively more easy maintained due to its relatively simple assembly, as well as being relatively inexpensive to manufacture, when compared to known industrial dust collectors actually used on construction sites and the likes.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A dust collector for collecting dust particles from dust laden air, said dust collector comprising:
   a cyclone body defining a cyclone body peripheral wall having an inner surface and delimiting a cyclone chamber having an upper end and a lower end, the cyclone body having a cyclone air inlet provided in the cyclone body peripheral wall for admitting the dust laden air in the cyclone chamber in a cyclonic flow, a cyclone body vacuum unit inlet allowing air extraction from the cyclone chamber and a cyclone body dust outlet positioned at the bottom end of the cyclone chamber for receiving dust particles extracted from the dust laden air circulating in the cyclone chamber;
   a vacuum unit for drawing air from the cyclone chamber, the vacuum unit being in fluid communication with the cyclone chamber through the cyclone body vacuum unit inlet;
   a dust filter covering the cyclone body vacuum unit inlet and extending within the cyclone chamber, the dust filter delimiting a wall to filter space extending horizontally between the inner surface of the cyclone body peripheral wall and the dust filter;

at least one baffle extending into the wall to filter space of the cyclone chamber and having a stem member projecting from the inner surface of the cyclone body peripheral wall and extending substantially between the upper end of the cyclone chamber and the lower end of the cyclone chamber, the at least one baffle being L shaped and having a first leg extending substantially perpendicularly to the inner surface of the cyclone body peripheral wall and a second leg extending substantially perpendicular to the first leg, with the first leg including at least one aperture defined therein and extending therethrough.

2. The dust collector of claim 1, wherein the dust filter extends vertically centrally within the cyclone chamber, between the upper end of the cyclone chamber and the lower end of the cyclone chamber.

3. The dust collector of claim 1, wherein the dust filter has an open ended upper end sealed around the cyclone body vacuum unit inlet and a lower end sealably closed by an end cap.

4. The dust collector of claim 1, wherein the at least one aperture is spaced apart from the inner surface of the cyclone body peripheral wall.

5. The dust collector of claim 4, wherein the first leg further comprises at least one louver extending at an angle therefrom, each one of the at least one louver being substantially in register with a corresponding one of the at least one aperture of the first leg.

6. The dust collector of claim 5, wherein the first leg comprises a plurality of louvers extending at an angle therefrom, with at least two of the plurality of louvers extending in a different orientation with regard to the first leg.

7. The dust collector of claim 1, wherein the stem member of the at least one baffle is oriented vertically at an angle of between about 20 degrees and about 90 degrees relative to the horizontal.

8. The dust collector of claim 7, wherein the stem member of the at least one baffle is oriented vertically at an angle of between about 30 degrees and about 70 degrees relative to the horizontal.

9. A dust collector for collecting dust particles from dust laden air, said dust collector comprising:
a cyclone body defining a cyclone body peripheral wall having an inner surface and delimiting a cyclone chamber having a lower end and an upper end, the cyclone body having a cyclone air inlet provided in the cyclone body peripheral wall for admitting the dust laden air in the cyclone chamber in a cyclonic flow, a cyclone body vacuum unit inlet positioned at the upper end of the cyclone chamber and a cyclone body dust outlet positioned at the bottom end of the cyclone chamber for receiving dust particles from the dust laden air circulating in the cyclone chamber;
a vacuum unit in fluid communication with the cyclone chamber through the cyclone body vacuum unit inlet, for drawing air from the cyclone chamber;
a dust filter covering the cyclone body vacuum unit inlet and extending vertically centrally within the cyclone chamber between the cyclone body vacuum unit inlet and the lower end of the cyclone chamber, the dust filter being sized shaped and positioned to define a wall to filter space extending horizontally between the inner surface of the cyclone body peripheral wall and the dust filter;
at least one baffle extending into the wall to filter space of the cyclone chamber and having a stem member projecting from the inner surface of the cyclone body peripheral wall, the stem member having an upper end substantially vertically aligned with the cyclone body vacuum unit inlet of the cyclone chamber, a lower end substantially vertically aligned with the cyclone body dust outlet of the cyclone chamber and at least one aperture defined therein and extending therethrough.

10. The dust collector of claim 9, wherein the dust filter has an open ended upper end sealed around the cyclone body vacuum unit inlet and a lower end sealably closed by an end cap.

11. The dust collector of claim 9, wherein the at least one aperture is spaced apart from the inner surface of the cyclone body peripheral wall.

12. The dust collector of claim 9, wherein the stem member further comprises at least one louver extending at an angle therefrom, each one of the at least one louver being substantially in register with a corresponding one of the at least one aperture of the stem member.

13. The dust collector of claim 12, wherein the stem member comprises a plurality of louvers extending at an angle therefrom, with at least two of the plurality of louvers extending in a different orientation with regard to the stem member.

14. The dust collector of claim 9, wherein the at least one baffle is L shaped, the at least one baffle having a first leg extending substantially perpendicularly to the inner surface of the cyclone body peripheral wall and a second leg extending substantially perpendicular to the first leg.

15. The dust collector of claim 9, wherein the stem member of the at least one baffle is oriented vertically at an angle of between about 20 degrees and about 90 degrees relative to the horizontal.

16. The dust collector of claim 15, wherein the stem member of the at least one baffle is oriented vertically at an angle of between about 30 degrees and about 70 degrees relative to the horizontal.

* * * * *